United States Patent [19]

Noguchi et al.

[11] Patent Number: 5,305,037
[45] Date of Patent: Apr. 19, 1994

[54] STROBE DEVICE OF CAMERA

[75] Inventors: Hirotaka Noguchi; Yuichi Kurosawa, both of Tokyo, Japan

[73] Assignee: Asahi Kogaku Kogyo Kabushiki Kaisha, Tokyo, Japan

[21] Appl. No.: 38,048

[22] Filed: Mar. 29, 1993

Related U.S. Application Data

[63] Continuation of Ser. No. 825,338, Jan. 27, 1992, abandoned, which is a continuation of Ser. No. 557,072, Jul. 25, 1990, abandoned.

[30] Foreign Application Priority Data

Aug. 2, 1989 [JP] Japan ................................. 1-200999
Aug. 2, 1989 [JP] Japan ................................. 1-201000

[51] Int. Cl.⁵ .............................................. G03B 15/03
[52] U.S. Cl. ............................................... 354/149.1
[58] Field of Search ............. 354/149.1, 149.11, 145.1, 354/126, 195.1

[56] References Cited

U.S. PATENT DOCUMENTS

| | | | |
|---|---|---|---|
| 3,783,261 | 1/1974 | Hartmann | 354/149.1 |
| 3,882,514 | 5/1975 | Graham | 354/149.1 |
| 4,515,453 | 5/1985 | Wakabayashi et al. | 354/149.1 |
| 4,570,203 | 2/1986 | Daniels et al. | 354/145.1 X |
| 4,743,929 | 5/1988 | Taniguchi et al. | 354/149.1 X |
| 4,847,647 | 7/1989 | Ueda | 354/149.1 |
| 4,970,537 | 11/1990 | Tsuboi | 354/126 |
| 5,012,262 | 4/1991 | Mogamiya et al. | 354/149.1 |
| 5,055,866 | 10/1991 | Takebayashi | 354/149.1 |
| 5,079,574 | 1/1982 | Ueno | 354/149.1 |

FOREIGN PATENT DOCUMENTS

| | | |
|---|---|---|
| 54-50324 | 4/1979 | Japan . |
| 57-122423 | 7/1982 | Japan . |
| 49140039 | 3/1984 | Japan . |
| 60-3824 | 1/1985 | Japan . |
| 1095686 | 12/1967 | United Kingdom . |
| 8500062 | 1/1985 | World Int. Prop. O. . |

*Primary Examiner*—Richard A. Wintercorn
*Assistant Examiner*—Howard B. Blankenship
*Attorney, Agent, or Firm*—Sandler Greenblum & Bernstein

[57] ABSTRACT

A strobe device is provided having a light emitting unit which emits light and a condenser lens which converges strobe light from the light emitting unit onto an object to be taken by a photographing lens. At least one of the light emitting unit and the condenser lens is movable between a normal illuminating position, in which the direction of illumination of the strobe light is parallel with the optical axis of the photographing lens, and a macro-illuminating position, in which the direction of illumination of the strobe light is inclined towards the optical axis of the photographing lens.

21 Claims, 5 Drawing Sheets

STROBE DEVICE OF CAMERA

This application is a continuation of application Ser. No. 07/825,338, filed Jan. 27, 1992, now abandoned; which is a continuation of application Ser. No. 07/557,072, filed Jul. 25, 1990, now abandoned.

BACKGROUND OF THE INVENTION

1. Field of the Invention

The present invention relates to a strobe device of a camera.

2. Description of Related Art

A strobe device of a camera essentially comprises a light emitting unit having a light emitting tube and a Fresnel lens (condenser lens) for gathering light from the light emitting unit. In a zoom strobe device which has been recently used, a distance between the light emitting unit and the condenser lens can be varied to control a strobe illuminating angle in order to make the strobe illuminating angle correspond to an angle of view of a photographing zoom lens. Development and improvement have been directed to a zoom strobe device which is usually used with a zoom lens camera.

On the other hand, a camera having a macro function in which a picture of an object at a close distance can be taken is known. However, in conventional strobe devices, including the zoom strobe device mentioned above, the optical axis thereof, (i.e. a center line of the illumination of strobe light) is fixed to be parallel with the optical axis of the photographing lens system. Therefore, in a macro-photographing situation, an illuminating range of the strobe light is deviated from an object which is photographed by the photographing lens, so that part of the object receives an insufficient quantity of light.

SUMMARY OF THE INVENTION

The primary object of the present invention is to provide a strobe device in which the direction of a illumination of strobe light can be inclined toward the optical axis of the photographing lens in a macro-photographing situation so that an object in the photographing range can be sufficiently illuminated with the strobe light.

To achieve the object mentioned above, according to the present invention, there is provided a strobe device having a light emitting unit and a condenser lens for emitting light from the light emitting unit as a strobe light, wherein at least one of the light emitting unit and the condenser lens is movable between a normal illuminating position, in which the direction of illumination is parallel with an optical axis of a photographing lens, and a macro-illuminating position, in which the direction of illumination is inclined toward the optical axis of the photographing lens.

In the case of the condenser lens being movable, the condenser lens is slidable in a direction that is perpendicular to the optical axis thereof and moves away from and toward the optical axis of the photographing lens, so that the condenser lens comes close to the optical axis of the photographing lens during macro-photographing to bring it into the macro-illuminating position.

In the case of the illuminating unit being movable, the illuminating unit is inclinable between a first position, in which the optical axis thereof is parallel with the optical axis of the photographing lens, and a second position, in which the axis of the illuminating unit is inclined toward the axis of the illuminating unit.

BRIEF DESCRIPTION OF THE DRAWINGS

The invention will be described below in detail with reference to the accompanying drawings, in which.

DESCRIPTION OF THE PREFERRED EMBODIMENTS

In the first and second embodiments, shown in FIGS. 1 through 3 and FIGS. 4 through 6, respectively, a condenser lens 6 (Fresnel lens) is slidable in a direction that is perpendicular to the optical axis of the condenser lens, i.e., toward the optical axis of a photographing lens to incline the strobe illumination direction towards the optical axis of the photographing lens.

Figure 1:
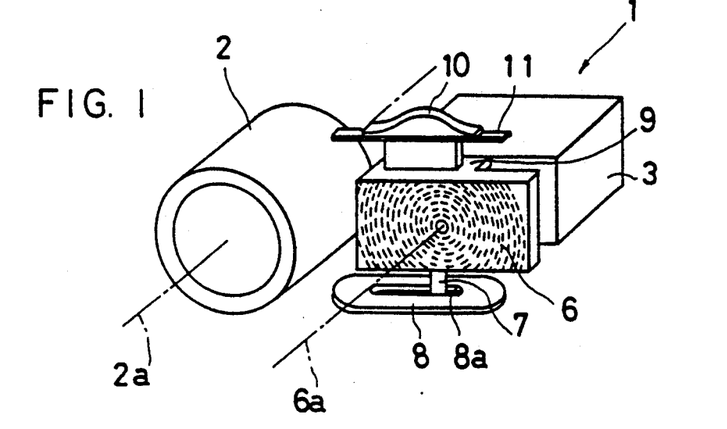
FIG. 1 is a perspective view of a strobe device according to a first embodiment of the present invention.
Figure 2:
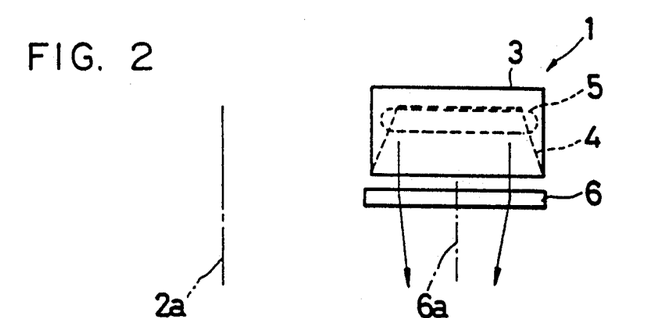
FIGS. 2 and 3 are plan views of the strobe device shown in FIG. 1, shown in a normal illuminating position and a macro-illuminating position, respectively.
Figure 3:
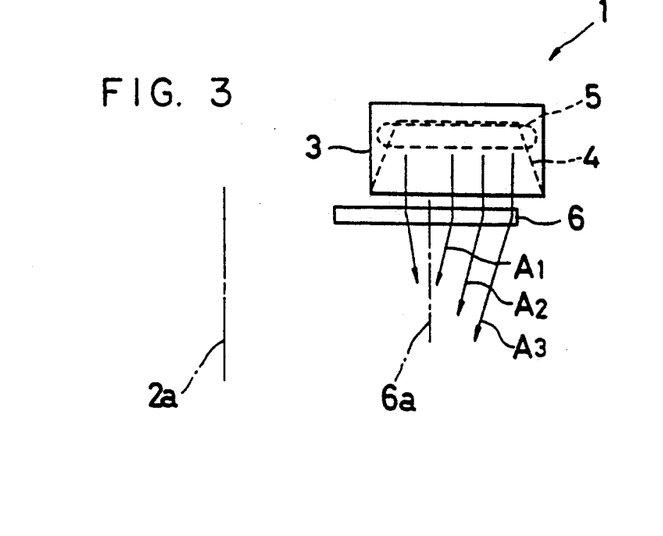

In the first embodiment shown in FIGS. 1 through 3, the condenser lens is manually moved to control the direction of illumination. In FIGS. 1 through 3, strobe device 1 is detachably mounted to a camera body (not shown) in the vicinity of the photographing lens 2, which makes macro-photographing possible. The strobe device 1 has a light emitting unit 3 that comprises a reflection mirror 4 (FIG. 2), a strobe light emitting tube 5 and the Fresnel lens (condenser lens) 6.

Optical axis 6a of the Fresnel lens 6 extends in parallel with optical axis 2a of the photographing lens 2. The Fresnel lens 6 is provided on its lower portion with a slide pin 7 which is slidably fitted in a laterally elongated hole 8a formed in a slide frame 8 located in front of the light emitting unit 3.

On the upper portion of the Fresnel lens 6 is an engaging projection 9 which has thereon a macro-function operating button 10 that projects from the body of the strobe device, so that when the macro-function operating button 10 is laterally moved, the Fresnel lens 6 slides along the elongated hole 8a. The macro-function operating button 10 has a sliding plate 11 which comes into slide contact with the upper wall portion of the strobe device and which closes an opening (not shown) formed in the upper surface of the strobe device.

In the strobe device 1, at the macro mode of the photographing lens 2, the macro-function operating button 10 is actuated to move the Fresnel lens 6 to come close to the photographing lens 2. As a result, the quantity of strobe light which is gathered in the direction of the optical axis 6a of the Fresnel lens 6 and which is emitted into the direction of the optical axis 2a of the photographing lens 2 is increased (arrows A1, A2, A3 in FIG. 3), so that the illumination range of the strobe light can be directed to the object. Thus when macro-photographing, the object can be illuminated with a sufficient quantity of strobe light.

On the other hand, when the condenser lens 6 is located in front of the light emitting unit 3 to be opposed thereto, as shown in FIG. 2, the strobe light is symmetrically emitted with respect to the optical axis 6a of the condenser lens 6.

Figure 4:
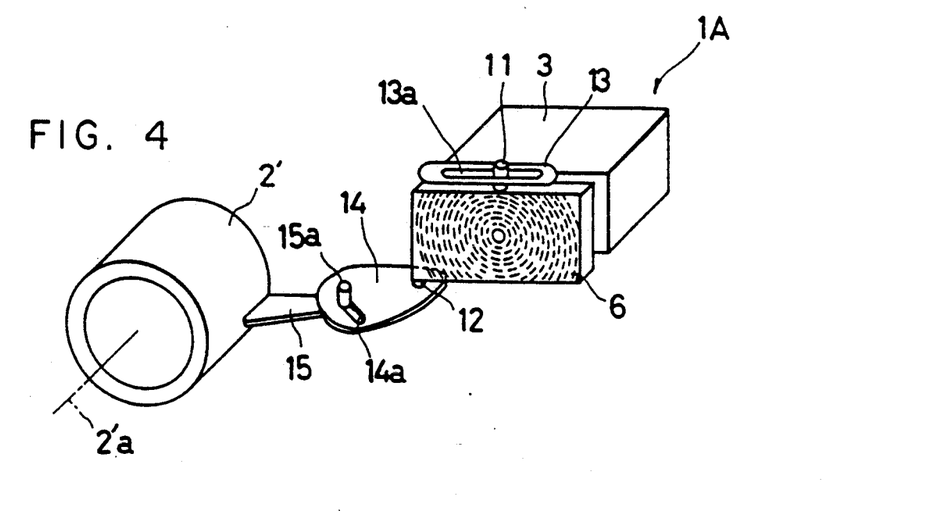
FIG. 4 is a perspective view of a strobe device according to a second embodiment of the present invention.
Figure 5:
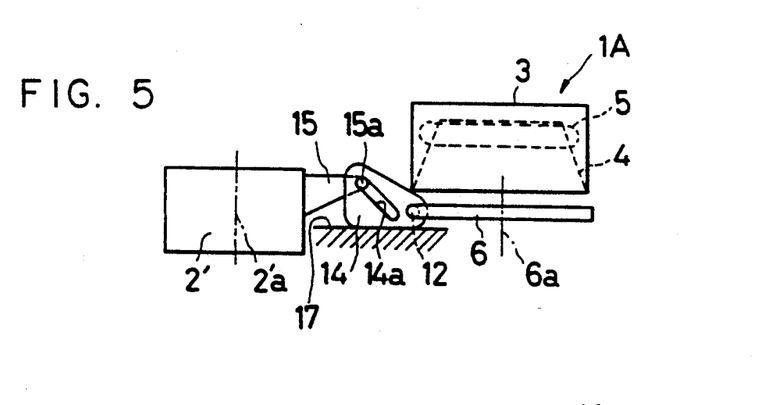
FIGS. 5 and 6 are plan views of the strobe device shown in FIG. 4, shown in a normal illuminating position and a macro-illuminating position, respectively.
Figure 6:
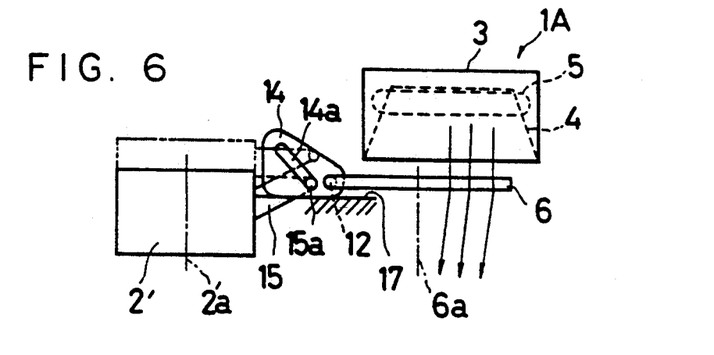

FIGS. 4 through 6 show a second embodiment of the present invention in which the changing operation of the direction of strobe illumination is associated with the operation of a photographing lens barrel 2'. In the second embodiment, the strobe device is provided in the camera body (not shown).

The Fresnel lens 6 is provided, on its upper center portion, with a slide pin 11 projecting therefrom, and on the lower end portion adjacent to the photographing lens 2', with an engaging pin 12. The slide pin 11 is slidably fitted in an elongated lateral hole 13a of a slide frame 13 which is mounted to a strobe receiving chamber of the camera body. The engaging pin 12 is mounted to a cam plate 14 which can slide only in the lateral direction of the camera along a slide guide surface 17. The cam plate 14 has a cam groove 14a which extends in a direction oblique to the optical axes 2a and 6a. In the cam groove 14a is slidably supported an engaging projection 15a of an engaging portion 15 which is provided on the periphery of the photographing lens barrel 2'. The photographing lens barrel 2' moves between a first position, in which it is located in front of the camera body at the macro-photographing, and a second position, in which the lens barrel 2' is retracted beside the camera body at the normal photographing. When the photographing lens barrel 2' moves to the first position for macro-photographing, the engaging projection 15a slides in the cam groove 14a, so that the cam plate 15 is moved toward the photographing lens barrel 2'. As a result, the Fresnel lens 6 is moved towards the photographing lens barrel 2'. When the photographing lens barrel 2' is moved toward the camera body to change the photographing mode from the macro-photographing position to the normal photographing position, as shown in FIG. 5, the cam plate 14 slides toward the light emitting unit 3, so that the Fresnel lens 6 is located in direct front of the light emitting unit 3.

When the photographing lens barrel 2' is brought into the macro-photographing position, the Fresnel lens 6 moves from a position located directly in front of the light emitting unit 3 towards the photographing lens barrel 2', so that when the strobe light is emitted, the quantity of strobe light which is emitted in the oblique direction with respect to the optical axis 2a' of the photographing lens barrel 2 is increased. Consequently, the object which is taken at the macro-photographing setting can be illuminated with a sufficient amount of strobe light to prevent a partially insufficient exposure.

FIGS. 7 through 9, FIGS. 10 through 12 and FIGS. 13 through 16 are different embodiments in which the light emitting unit is inclined with respect to the optical axis of the photographing lens to direct the strobe illumination into the optical axis of the photographing lens.

Figure 7:
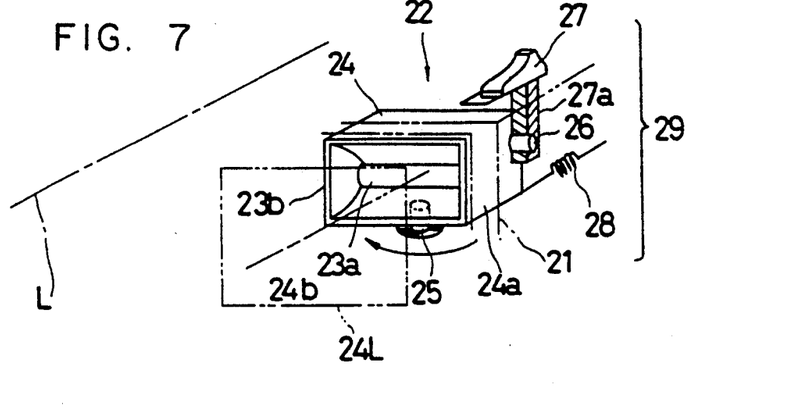
FIG. 7 is a perspective view of a strobe device according to a third embodiment of the present invention.
Figure 8:
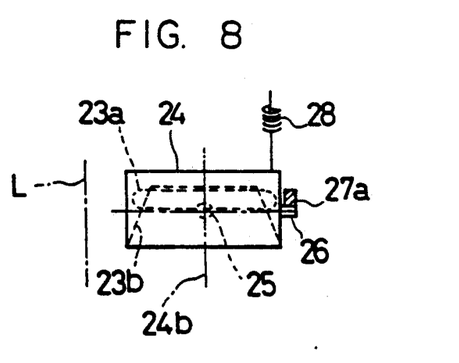
FIGS. 8 and 9 are plan views of the strobe device shown in FIG. 7, shown in a normal illuminating position and a macro-illuminating position, respectively.
Figure 9:
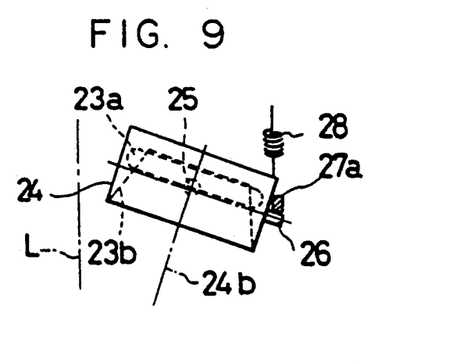

In a strobe device 22 of an embodiment shown in FIGS. 7 through 9, the light emitting unit is manually inclined to change the direction of the illumination.

Camera body 21 has the strobe device 22 incorporated therein. The strobe device 22 has a light emitting unit 24, comprising a strobe light emitting tube 23a and a reflection mirror 23b, and a condenser lens 24L. The light emitting unit 24 is provided on its lower surface with a pin 25 which is pivoted to the bottom surface of a strobe receiving chamber (not shown), so that the light emitting unit 24 is rotatable through the pin 25. The light emitting unit 24 is provided on its side wall 24a far from the photographing lens optical system (the optical axis L thereof is shown), with a projection 26, which is engaged by an engaging rod 27a of a macro-function operating button 27 provided in the vicinity of the side wall 24a of the light emitting unit 24. To the rear surface of the light emitting unit 24 is secured a tensile spring 28 which extends from the rear portion of the strobe receiving chamber to bias the light emitting unit 24 to rotate about the pin 25. The direction of the biasing force is such that the forward extension of the center direction 24b of the strobe illumination comes away from the optical axis L of the photographing lens. Normally, however, the light emitting unit 24 is engaged by an abutment (not shown) provided in the strobe receiving chamber, so that the center direction 24b of the strobe illumination is substantially parallel with the optical axis L of the photographing lens optical system, as shown in FIG. 8.

The macro-function operating button 27 is slidably supported by the camera body 21 to reciprocate in the forward and backward directions of the camera body 21. When the macro-function operating button 27 is moved in the forward direction of the camera body 21, the light emitting unit 24 rotates about the shaft (pin) 25 to incline the center line 24b of the strobe illumination direction, so that the forward extension of the center line 24b comes close to the optical axis L of the photographing lens (FIG. 9). The macro-function operating button 27 keeps the oblique position of the light emitting unit 24 against the tensile coil spring 28.

The pin (shaft) 25, the projection 26, the macro-function operating button 27 and the tensile coil spring 28 constitute an inclination angle adjusting mechanism 29 of the strobe frame. When the macro-function operating button 27 is moved in the forward direction of the camera body 21, the light emitting unit 24 rotates about the shaft 25 against the coil spring 28, so that the light emitting unit 24 is inclined to move the forward extension of the center line 24b of the illumination direction of the strobe light toward the optical axis L of the photographing lens.

Figure 10:
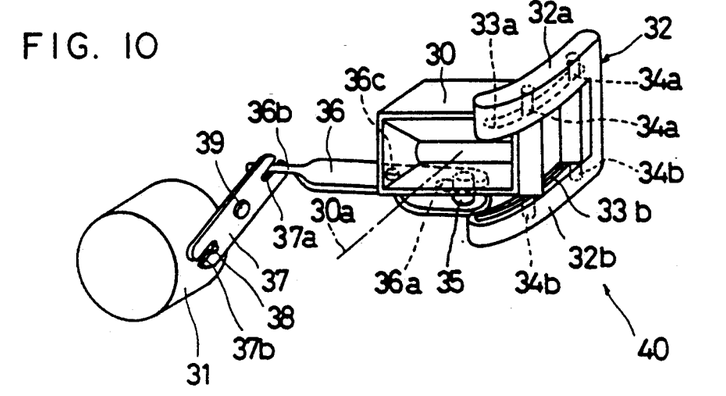
FIG. 10 is a perspective view of a strobe device according to a fourth embodiment of the present invention.
Figures 11, 12:
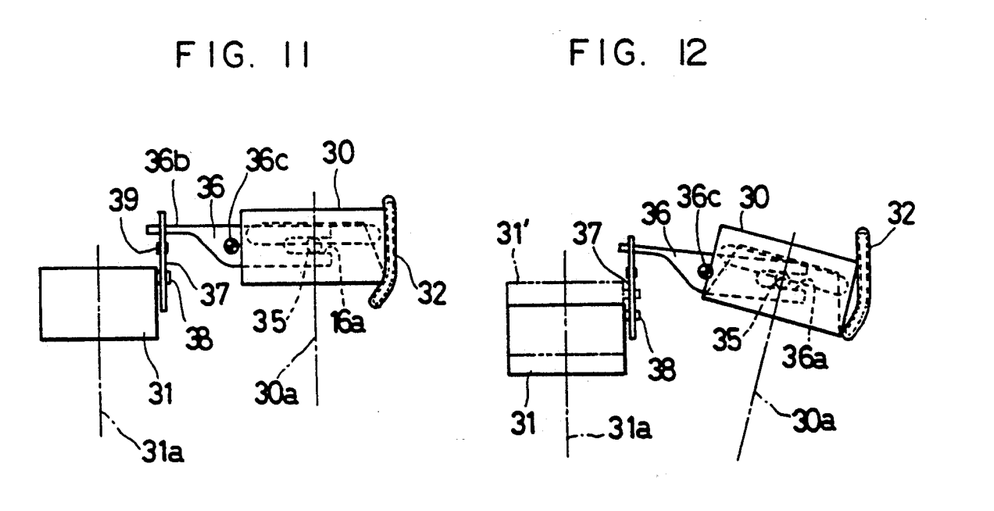
FIGS. 11 and 12 are plan views of the strobe device shown in FIG. 10, shown in a normal illuminating position and a macro-illuminating position, respectively.

FIGS. 10 through 12 show a different embodiment, in which light emitting unit 30 is provided on its side portion with a slide frame 32 which extends substantially in parallel with the optical axis 11a of the photographing lens barrel 31. The slide frame 32 has upper and lower frame portions 32a and 32b which have front ends bent toward the photographing lens barrel 31. The upper and lower frame portions 32a and 32b have grooves 33a and 33b which extend in the direction of the length of the frame portions. In the grooves 33a and 33b are slidably fitted two pairs of upper and lower slide projections 34a and 34b which are provided on the side wall of the light emitting unit 30. The upper slide projections 34a and the lower slide projections 34b are spaced from one another in the longitudinal direction of the frame portions 32a and 32b, respectively. The light emitting unit 30 is provided on its lower surface with a driven projection 35 which is engaged in a recess 36a which is formed in a lever 36. The lever 36 is rotatably provided in the camera body in the vicinity of the strobe receiving chamber. The recess 36a is formed at one end of the lever 36. The opposite end of the lever 36 has a projection 36b which is engaged by one end of a lever 37 that is rotatably pivoted to the camera body. The lever 36 is rotatably supported at the intermediate portion thereof by a pivot pin 36c provided on the camera body. The lever 37 has at its opposite ends recesses 37a and 37b, so that the projection 36b of the lever 36 is engaged in the recess 37a of the lever 37. In the recess 37b is fitted a projection 38 which is provided on the periphery of the photographing lens barrel 31. The lever 37 is pivoted at its intermediate portion to the camera body through an immovable pin 39 provided in the camera body. The photographing lens barrel 31 is moved in the forward direction of the camera in the macro-mode.

In the embodiment illustrated in FIGS. 10 through 12, the slide frame 32, the slide projections 34a and 34b of the light emitting unit 30, the driven projection 35, the levers 36 and 37, the projection 38 of the photographing lens barrel 31, the pin 39 which supports the lever 37 at the intermediate portion thereof constitute an inclination angle adjusting mechanism of the strobe frame. When the photographing lens barrel 31 is moved forward, the lever 37 rotates about the pin 39 to rotate the lever 36, so that the light emitting unit 30 is moved in the forward direction by the slide frame 32. As a result, the slide projections 34a and 34b provided on the side wall of the light emitting unit 30 slide in the corresponding grooves 33a and 33b of the slide frame 32. When the light emitting unit 30 is moved in the forward direction of the camera body, the front bent ends of the upper and lower frame portions 32a and 32b cause the light emitting unit 30 to be inclined, so that the forward extension of the center line 30a of the direction of illumination is inclined toward the optical axis 31a of the photographing lens barrel 31 (FIG. 12).

At the normal photographing position of the photographing lens barrel 31, the photographing lens barrel 31 is located in a position shown at an imaginary line 31' in FIG. 12, so that no inclination of the light emitting unit 30 takes place, as shown in FIG. 11. Namely, the center line 30a of the illumination (light) is in parallel with the optical axis 31a of the photographing lens barrel 31.

Figure 13:
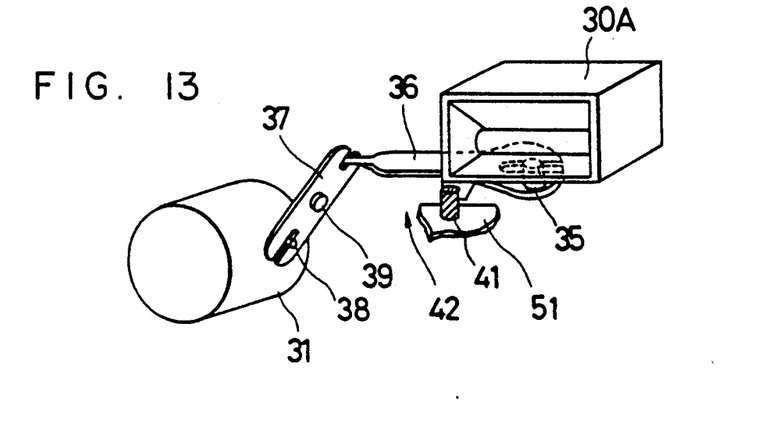
FIG. 13 is a perspective view of a strobe device according to a fifth embodiment of the present invention.
Figure 14:
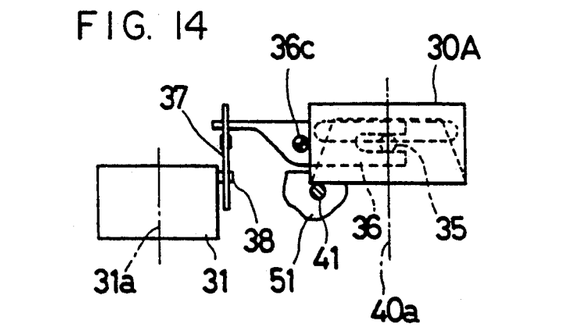
FIGS. 14 and 15 are plan views of a strobe device shown in FIG. 13, shown in a normal illuminating position and a macro-illuminating position, respectively.
Figure 15:
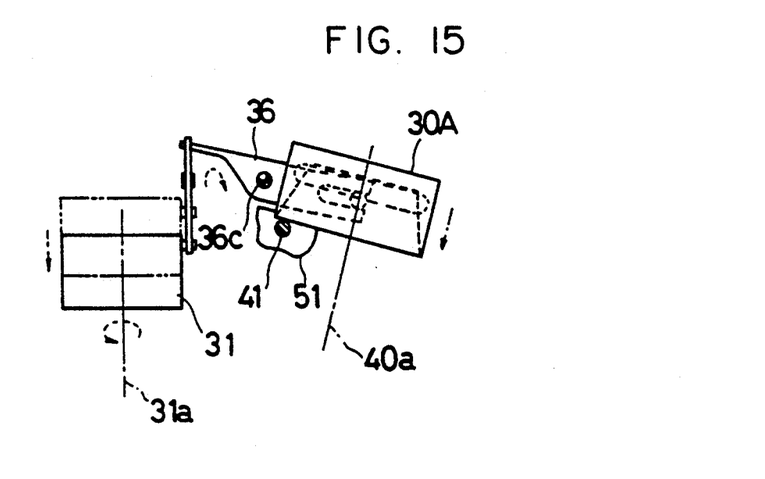

FIGS. 13 through 15 show still another embodiment of the invention, in which the light emitting unit 30A is provided on its lower front surface with a rotational pin 41 which is pivoted to the camera body 51. Namely, the light emitting unit 30A is rotatable about the axis of the rotational pin 41 together therewith. The construction of the embodiment illustrated in FIGS. 12 through 15 is substantially the same as that of the embodiment illustrated in FIGS. 10 through 12.

The driven projection 35 of the light emitting unit 30A, the levers 36 and 37, the projection 38 of the photographing lens barrel 31, and the pin 39 which supports the lever 37 at the intermediate portion constitute an inclination angle adjusting mechanism 42 of the light emitting unit 30A. When the photographing lens barrel 31 is moved forward (FIG. 15), the lever 37 rotates about the pin 39 to rotate the lever 36, so that the light emitting unit 30A rotates about the pin 41.

At the normal photographing position other than the macro-mode, no rotation of the light emitting unit 30A occurs (FIG. 14). Accordingly, the center line 40a of the illumination (light) is parallel with the optical axis 31a of the photographing lens barrel 31.

Note that the inclination angle of the light emitting unit 24, 30 or 30A is exaggerated for clarity in the illustrated embodiments. The actual inclination angle of the light emitting unit is determined in accordance with the close object distance of the photographing lens system, and the distance between the photographing lens and the strobe device, etc.

We claim:

1. A strobe device comprising a light emitting unit comprising a light source which emits strobe light:

a condenser lens which projects said strobe light from said light emitting unit onto an object to be taken by a photographic lens; and means for moving one of said light emitting unit and said condenser lens between a normal illuminating position, in which the direction of illumination of said strobe light, as defined by a direction of a central axis of said strobe light, is parallel with an optical axis of said photographing lens and a macro-illuminating position, in which the direction of illumination of said strobe light is inclined towards the optical axis of said photographing lens and wherein said condenser lens is movable in a direction perpendicular to said central axis between said normal illuminating position, in which the direction of illumination of the strobe light is parallel with the optical axis of said photographing lens, and said macro-illuminating position, in which the direction of illumination of said strobe light is inclined towards the optical axis of said photographing lens.

2. The strobe device of claim 1, wherein said movement of said condenser lens between said normal illuminating position and said macro-illuminating position is manually effected.

3. The strobe device of claim 1, further comprising a photographing lens movable between a normal photographing position and a macro-photographing position, said positions corresponding to said normal illuminating position and said macro-illuminating position, respectively.

4. The strobe device of claim 3, wherein said photographing lens comprises a movable member which is movable in the optical axis direction and which is associated with said condenser lens, so that when said photographing lens is in said macro-photographing position, said condenser lens is moved to said macro-illuminating position, and when said photographing lens is in said normal photographing position, said condenser lens is moved to said normal illuminating position.

5. The strobe device according to claim 1, further comprising means for biasing said movable one of said light emitting unit comprising a light source and said condenser lens towards one of said normal illuminating position and macro illuminating position.

6. The strobe device according to claim 1, further comprising a photographing lens movable into a macro photographing position, said macro photographing position being related to the macro illuminating position defined by said movable one of said light emitting unit and said condensing lens.

7. The strobe device according to claim 6, further comprising means associating the movement of said photographing lens to said macro photographing position with the movement of said movable one of said light emitting unit and said condenser lens to said macro-illuminating position.

8. A strobe device according to claim 1, said means for moving comprising means positioning said condenser lens and said light emitting unit such that strobe light is projected through said condenser lens in both the normal illuminating position and the macro-illuminating position.

9. The strobe device according to claim 1, said moving comprising means for moving one of said means for light emitting unit and said condenser lens with respect to the other of said light emitting unit and said condenser lens.

10. The strobe device according to claim 1, further comprising a guide member which guides said condenser lens during movement of said condenser lens.

11. The strobe device according to claim 10, said guide member comprising means for guiding said condenser lens for movement in a direction perpendicular to the central axis of said strobe light.

12. The strobe device according to claim 1, said condenser lens comprising a Fresnel lens.

13. The strobe device according to claim 1, said means for moving comprising a manually actuatable member for moving said condenser lens to control the direction of illumination.

14. The strobe device according to claim 1, further comprising means for associating movement of said condenser lens between the normal illuminating position and the macro-illuminating position with movement of said photographing lens.

15. A strobe device comprising a light emitting unit comprising a light source which emits strobe light, a condenser lens which projects said strobe light from said light emitting unit onto an object to be photographed by a photographing lens and means for moving at least one of said light emitting unit and said condenser lens between a normal illuminating position and a macro-illuminating position in association with movement of said photographing lens between a normal photographing position and a macro-photographing position, said means for moving comprising means for moving one of said light emitting unit and said condenser lens in a direction perpendicular with respect to a center axis of the other one of said light emitting unit and said condenser lens between said normal illuminating position and said macro-illuminating position.

16. The strobe device according to claim 15, said condenser lens comprising means for projecting strobe light in both said normal illuminating position and said macro-illuminating position.

17. The strobe device according to claim 15, further comprising a guide member which guides said condenser lens during movement of said condenser lens.

18. The strobe device according to claim 17, said guide member comprising means for guiding said condenser lens for movement in a direction substantially transverse to a central axis of said strobe light.

19. The strobe device according to claim 15, said condenser lens comprising a Fresnel lens.

20. The strobe device according to claim 15, said means for moving comprising a manually actuatable member for moving said condenser lens to control the direction of the illumination.

21. The strobe device according to claim 15, further comprising means for associating movement of said condenser lens between the normal illuminating position and the macro-illuminating positions with movement of said photographing lens.

* * * * *

UNITED STATES PATENT AND TRADEMARK OFFICE
CERTIFICATE OF CORRECTION

PATENT NO. : 5,305,037
DATED : April 19, 1994
INVENTOR(S) : Hirotaka NOGUCHI et al.

It is certified that error appears in the above-indentified patent and that said Letters Patent is hereby corrected as shown below:

On the cover, in section [56], "References Cited", line 14, change "1/1982" to ---1/1992---.
    At column 7, line 15 (claim 9, line 1) insert ---means for--- after "said".
    At column 7, line 16 (claim 9, line 2) delete " means for" after "said".
    At column 8, line 26 (claim 18, line 3) change "substantially transverse" to ---perpendicular---.

Signed and Sealed this

Twelfth Day of September, 1995

Attest:

BRUCE LEHMAN

Attesting Officer     Commissioner of Patents and Trademarks